United States Patent
Ren

(10) Patent No.: US 6,317,926 B1
(45) Date of Patent: Nov. 20, 2001

(54) FIXING DEVICE FOR LCD UNIT

(75) Inventor: Huey-Shyang Ren, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/639,803

(22) Filed: Aug. 17, 2000

(51) Int. Cl.⁷ .................................. E05D 7/12; E05D 5/10
(52) U.S. Cl. .................................. 16/271; 16/382; 16/387; 16/235; 16/221; 403/12; 248/201; 248/544
(58) Field of Search ............................... 16/271, 272, 382, 16/387, 389, 235, 249, 266, 268, 221; 403/12, 11; 29/11; 361/679–686, 785; 248/201, 224.7, 544, 547, 200, 213.1, 220.31, 224.51, 224.61, 225.11

(56) References Cited

U.S. PATENT DOCUMENTS

| | | | |
|---|---|---|---|
| 2,591,984 | * | 4/1952 | Walsh ..................................... 16/271 |
| 2,722,034 | * | 11/1955 | May ........................................ 16/266 |
| 4,188,658 | * | 2/1980 | Aron ...................................... 248/214 |
| 4,434,523 | * | 3/1984 | Grass ..................................... 16/242 |
| 5,896,622 | * | 4/1999 | Lu .......................................... 16/342 |
| 6,163,927 | * | 12/2000 | Leu ........................................ 16/272 |

* cited by examiner

Primary Examiner—Chuck Y. Mah
(74) Attorney, Agent, or Firm—Birch, Stewart, Kolasch & Birch, LLP

(57) ABSTRACT

This invention provides a device for fixing an LCD unit for a computer. It includes two slots formed on the main body of computer for receiving two connecting blades of pivots of the LCD unit. Each of the connecting blades is formed with a step portion in the middle of the blade so as to temporarily keep the LCD unit in a position suitable for users to connect the connectors between the LCD unit and the main body of computer when the step portions are placed on rims of the slots. The LCD unit needs no hands to hold, so the connectors can be easily handled by both hands, and the wires can be well connected.

7 Claims, 5 Drawing Sheets

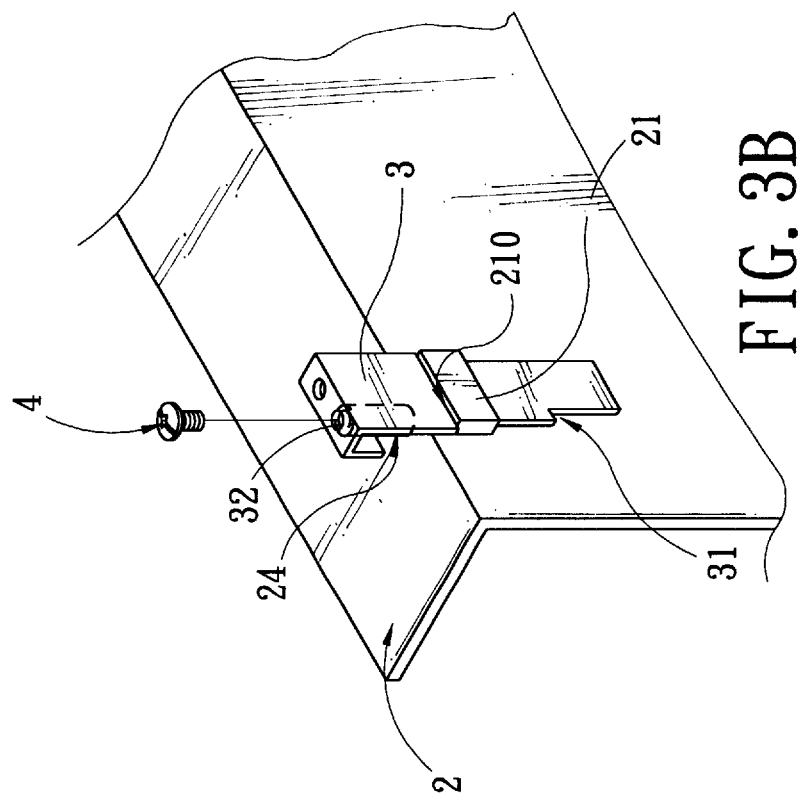
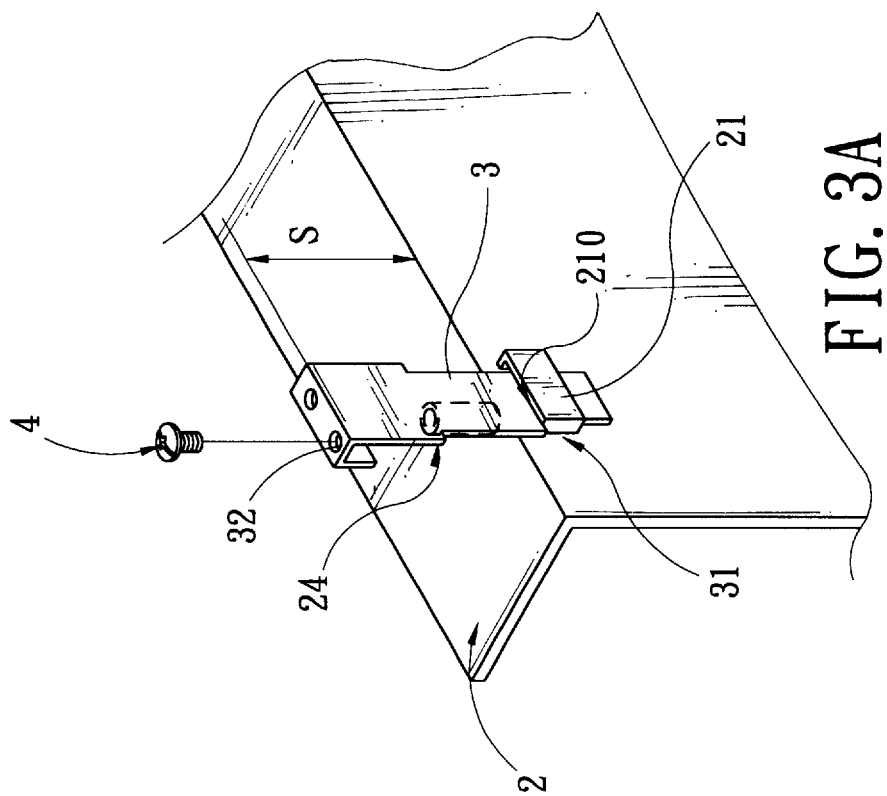

FIXING DEVICE FOR LCD UNIT

BACKGROUND OF THE INVENTION

1. Field of Invention

The present invention relates to a device for fixing an LCD (liquid crystal display) unit for a computer, and more particularly relates to a device for fixing an LCD unit for a computer which will simplify the assembly process.

2. Related Art

In a computer structure, the device for fixing an LCD unit to a main body of computer generally includes a pair of slots formed on the case of the computer, and a pair of connecting blades extended from pivots of the LCD unit and capable of being inserted into the slots. As shown in FIG. 1A, there are two pivots 91 formed under the LCD unit 9 of the computer. Each pivot 91 includes two relatively rotating portions in which one portion 911 is fixed to the LCD unit; while the other portion 912 is connected to a connecting plate 8 by a screw 913, so that the LCD unit 9 can be rotated relatively to the connecting plate 8. At least a connector 93 and wires are used to connected to a mating connector and wires on the main body 2 of the computer so as to transmit signals from the computer to the LCD. As shown in FIG. 1B, in the process of assembly, the LCD unit 9 with connecting blades 8 fixed thereon is first placed on the slots 21 of the main body 2 with the connecting blades 8 partially inserted in the slots 21. In order to prevent the LCD unit from dropping and hindering the connectors 93 to be connected to the main body 2, one has to hold the LCD unit 9 by one hand, and use the other hand for connecting the connectors 93. This one hand operation for connecting the connectors in the narrow space makes the process more difficult which may either cause mishandling of the connection, or happening of wire damage and poor connection.

SUMMARY OF THE INVENTION

It is therefore an object of the present invention to provide a device for fixing an LCD unit for a computer. The device makes the assembly process easier that during assembly, the LCD unit can stay by itself in a temporary position on a slot formed on the main body of computer so as to be free from being held by hand. Therefore, one can uses both hands to handle the connectors and assures a firm connection of the wires. Since the LCD unit stays in the temporary position to keep a suitable clearance to the main body, the connectors can be easily handled, and the wires can be well connected.

To achieve the aforesaid object, a device for fixing an LCD unit for a computer according to the present invention includes two slots formed on the main body of computer for receiving two connecting blades of pivots of an LCD unit. The improvement is that each of the connecting blades is formed with a step portion in the middle of the blade so as to temporarily keep the LCD unit in a position suitable for users to connect the connectors between the LCD unit and the main body of computer when the step portions are placed on rims of the slots. After finishing connection, the connecting blades can be shifted to release the step portions from placing on the slot, and fully inserted into the slots and fastened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 3A is a perspective view of a device of the present invention showing the LCD unit staying in temporary position;

FIG. 3B is further a perspective view of a device of the present invention showing the LCD unit being fixed in a final position;

DETAILED DESCRIPTION OF THE INVENTION

Figure 1A:
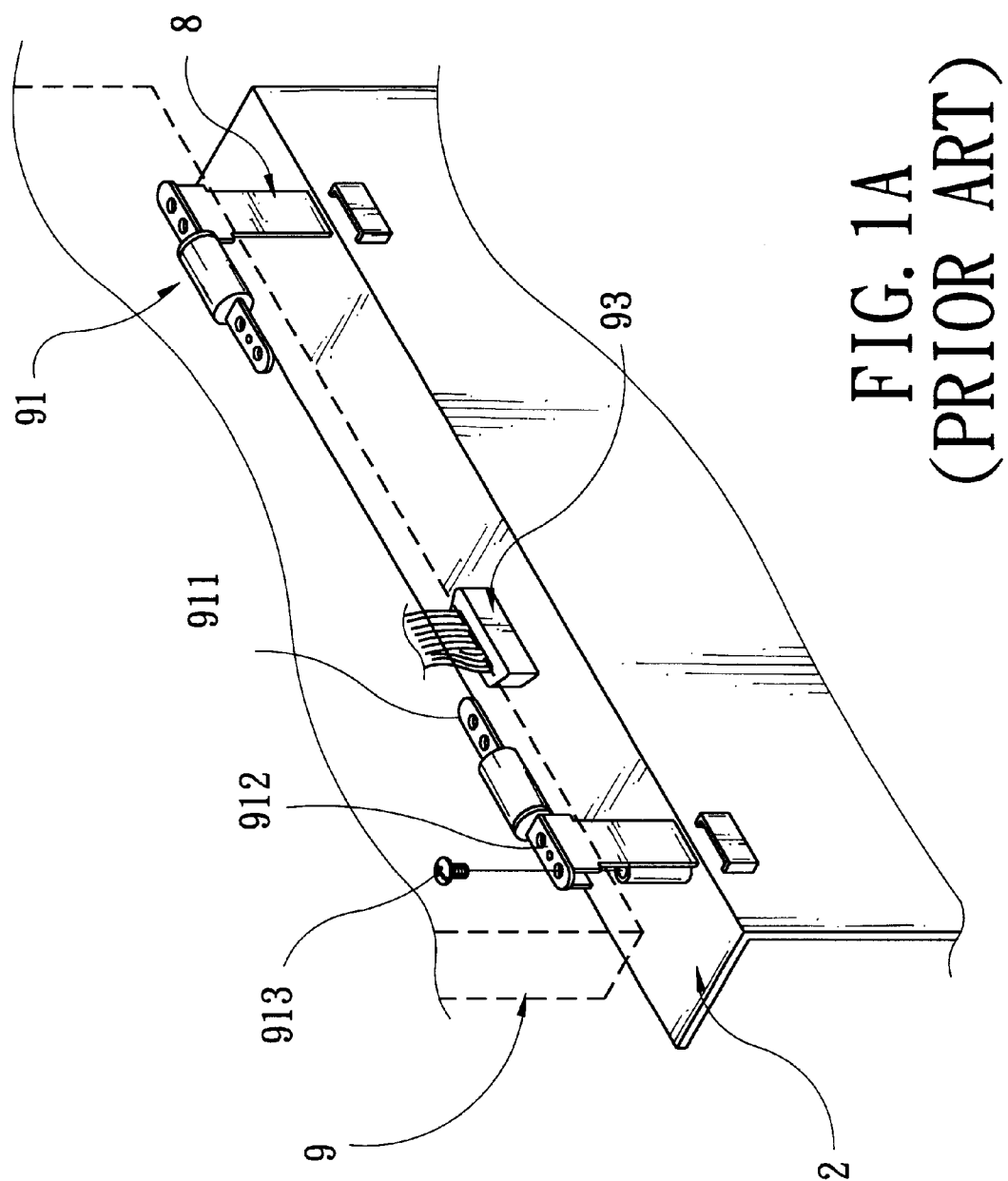
FIG. 1A is a perspective view of a conventional device for fixing an LCD unit for a computer.
Figure 1B:
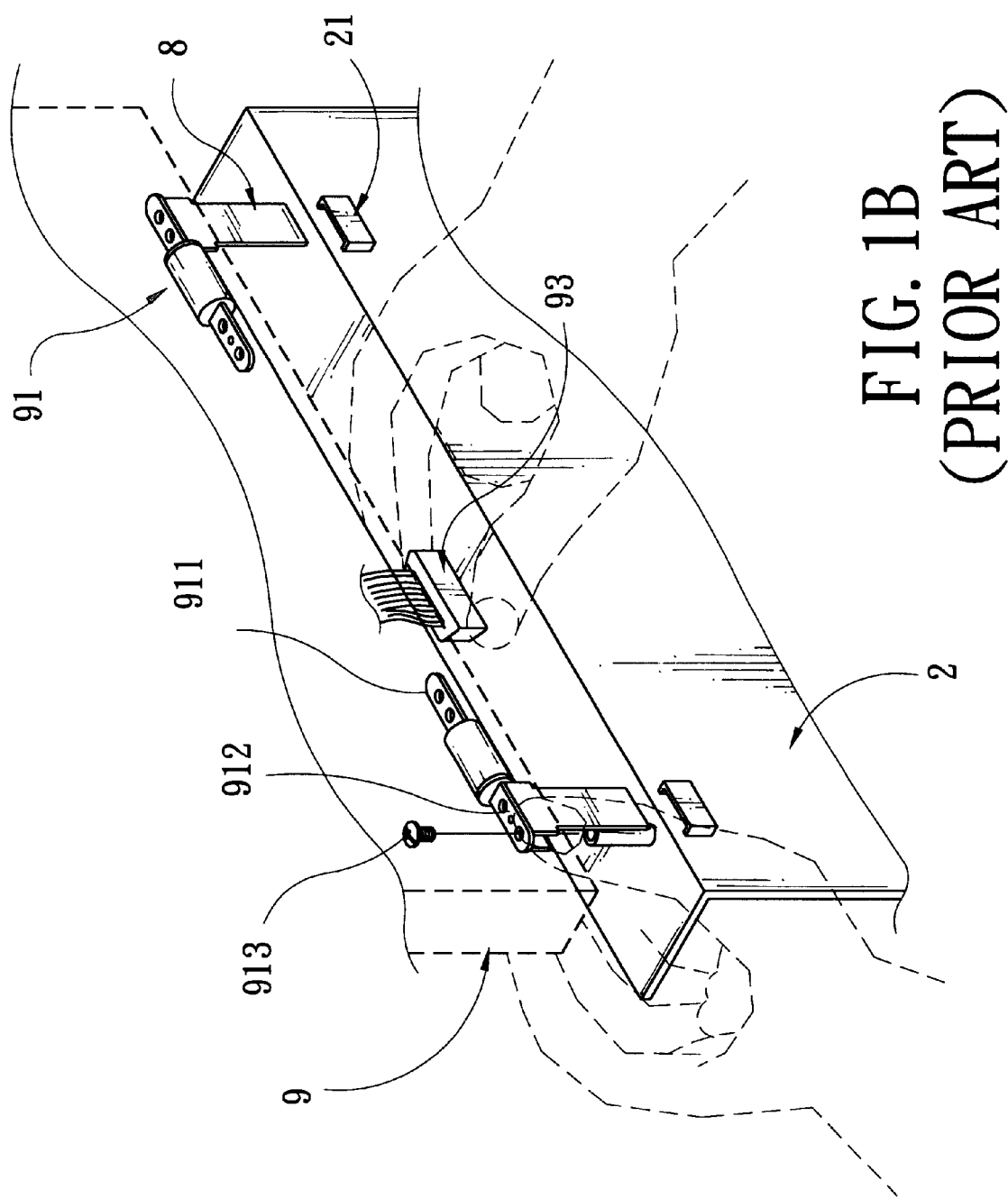
FIG. 1B is further a perspective view showing how the conventional device for fixing an LCD unit is being assembled.

The composition and assembly process of a conventional device for fixing an LCD unit has been described above with reference to FIGS. 1A and 1B.

Figure 2:
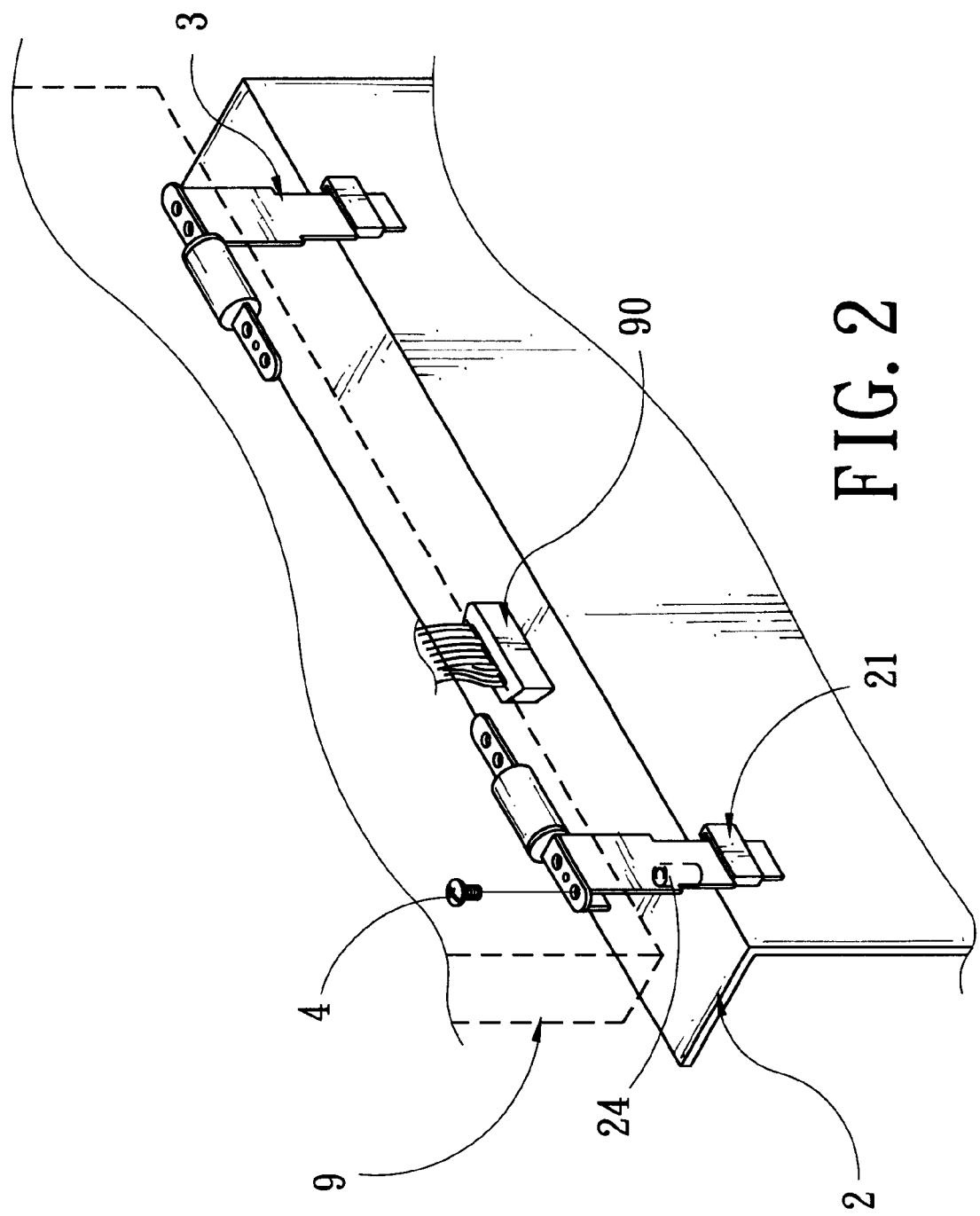
FIG. 2 is a perspective view of a device for fixing an LCD unit for a computer according to the present invention.

Now referring to FIG. 2, a device for fixing an LCD unit 9 for a computer according to the present invention includes two slots 21 formed on the main body 2 of the computer for receiving two connecting blades 3 of pivots of the LCD unit 9. The improvement is that each of the connecting blades 3 is formed with a step portion 31 in the middle of the blade so as to temporarily keep the LCD unit 9 in a position suitable for users to connect the signal wires 90 between the LCD unit 9 and the main body 2 of computer when the step portions 31 are placed on rims of the slots 21.

In detail, as shown in FIG. 3A, during assembly, the connecting blade 31 which is a part of a pivot of the LCD unit is first placed by its step portion 31 on the rim 210 of the slot 21 so as to stay there and keep the LCD unit 9 with a suitable space S to the main body 2 of computer. The LCD unit 9 does not require being held by hands, so the user can free both hands for stably connecting the wires to ensure a good connection without tearing or damaging the wires 90 or connectors.

After finishing the connection, as shown in FIG. 3B, each of the connecting blade 3 can be shifted to release the step portion 31 from placing on the rim 210 of the slot 21, and fully inserted into the slot 21, then fastened by a screw 4 to a stud 24 formed on the main body 2 of the computer. Finally, the LCD unit 9 is fixed to the main body 2 of computer.

Figure 4B:
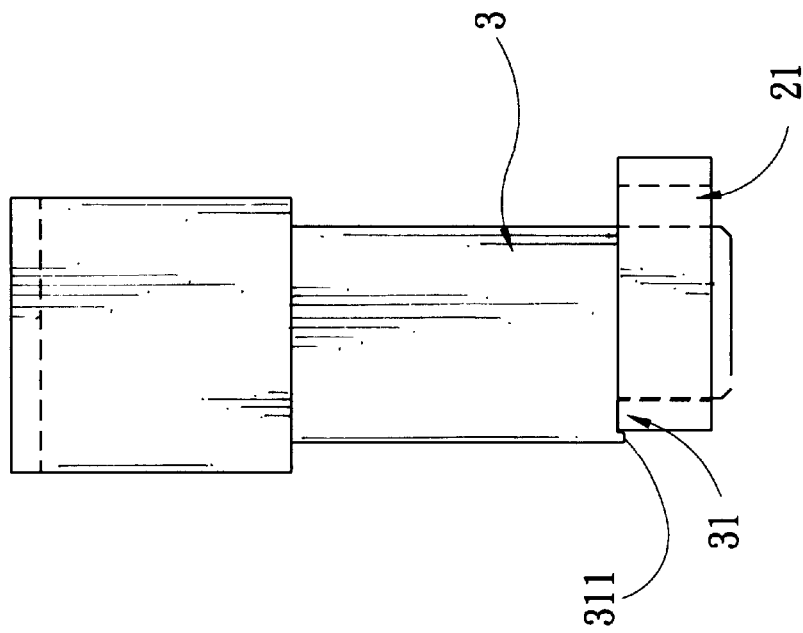
FIG. 4B is a front view of a second embodiment of a connecting blade applied in the device of the present invention.
Figure 4A:
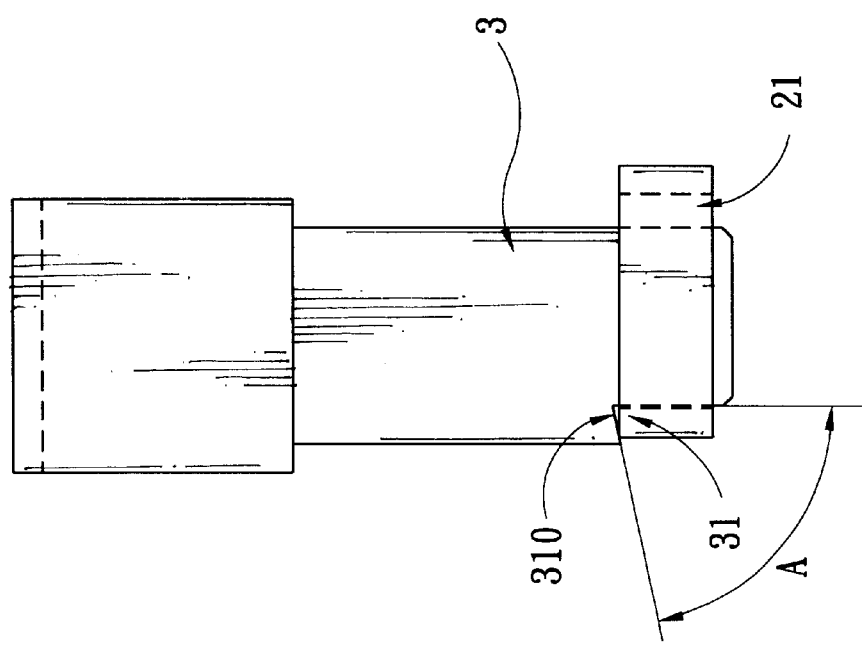
FIG. 4A is a front view of a first embodiment of a connecting blade applied in the device of the present invention.

In order to prevent the step portion 31 from slipping away from rim 210 of the slot 21, the shape of the step portion 31 can be formed as shown in FIGS. 4A and 4B.

FIG. 4A shows a first embodiment of the connecting blade. The step portion 31 of the connecting blade 3 is formed with a sharp angle in the inner corner. In other words, the holding edge 310 is a downward slope to make the step portion 31 stably stay on the rim 210 of the slot 21 by the downward weight of the LCD unit 9 forcing on the connecting blade 3.

FIG. 4B shows a second embodiment of the connecting blade. The step portion 31 of the connecting blade 3 is formed with a downward portion 311 to prevent the step portion 31 from slipping away from the slot 21 when the downward weight of the LCD unit 9 forcing on the connecting blade 3.

In conclusion, the step portions of the connecting blades in the present invention make the LCD unit stay in a temporary position on the rims of slots of the main body of computer. So that the LCD unit can leave a space from the main body without being held by user's hands. The user therefore can easily connect the signal wires between the LCD unit and the main body to assure a good connection. The process is thus time-saving and effective.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fixing device for LCD unit, applicable to a computer for fixing the LCD unit to a main body of the computer, comprising:

two slots formed on the main body of the computer; and two connecting blades of pivots of the LCD unit inserting into the slots, each of the connecting blades is formed with a step portion in the middle of the blade so as to temporarily keep the LCD unit in a position suitable for users to connect the wires between the LCD unit and the main body of the computer when the step portions are placed on rims of the slots.

2. A fixing device for LCD unit as recited in claim 1 wherein the connecting blades are kept in a temporary position to keep a predetermined space between the LCD unit and the main body of computer for easier connection of wires when the step portions are placed on the rims of the slots, and moved fully into the slots as a final position after the wires being connected.

3. A fixing device for LCD unit as recited in claim 2 wherein the connecting blades are fastened by screws to the main body as in the final position.

4. A fixing device for LCD unit as recited in claim 3 wherein each of the connecting blades is formed with two holes to be fixed by screws respectively to the pivot of LCD unit and the main body of computer.

5. A fixing device for LCD unit as recited in claim 1 wherein each of the connecting blades is formed with a cutout at the step portion.

6. A fixing device for LCD unit as recited in claim 5 wherein the step portion of the connecting blade has a downward slope to make the connecting blade stably stay on the rim of the slot by the downward weight of the LCD unit forcing on the connecting blade.

7. A fixing device for LCD unit as recited in claim 5 wherein the step portion of the connecting blade is formed with a downward portion at an outer end of the cutout to prevent the step portion from slipping away from the slot when the downward weight of the LCD unit forcing on the connecting blade.

* * * * *